INFORMATION TRANSLATING SYSTEM

Filed Jan. 15, 1957 2 Sheets-Sheet 1

INVENTORS.
Kun Li Chien &
William J. DePhillipo
BY Morris A. Rabkin
ATTORNEY.

Sept. 1, 1959 W. J. DE PHILLIPO ET AL 2,902,679

INFORMATION TRANSLATING SYSTEM

Filed Jan. 15, 1957 2 Sheets-Sheet 2

INVENTORS.
Kun Li Chien &
William J. De Phillipo
BY Morris Robin
ATTORNEY.

United States Patent Office 2,902,679

Patented Sept. 1, 1959

2,902,679

INFORMATION TRANSLATING SYSTEM

William J. De Phillipo, Philadelphia, Pa., and Kun Li Chien, Fullerton, Calif., assignors to Radio Corporation of America, a corporation of Delaware Application January 15, 1957, Serial No. 634,183

13 Claims. (Cl. 340—174)

Figure 1:
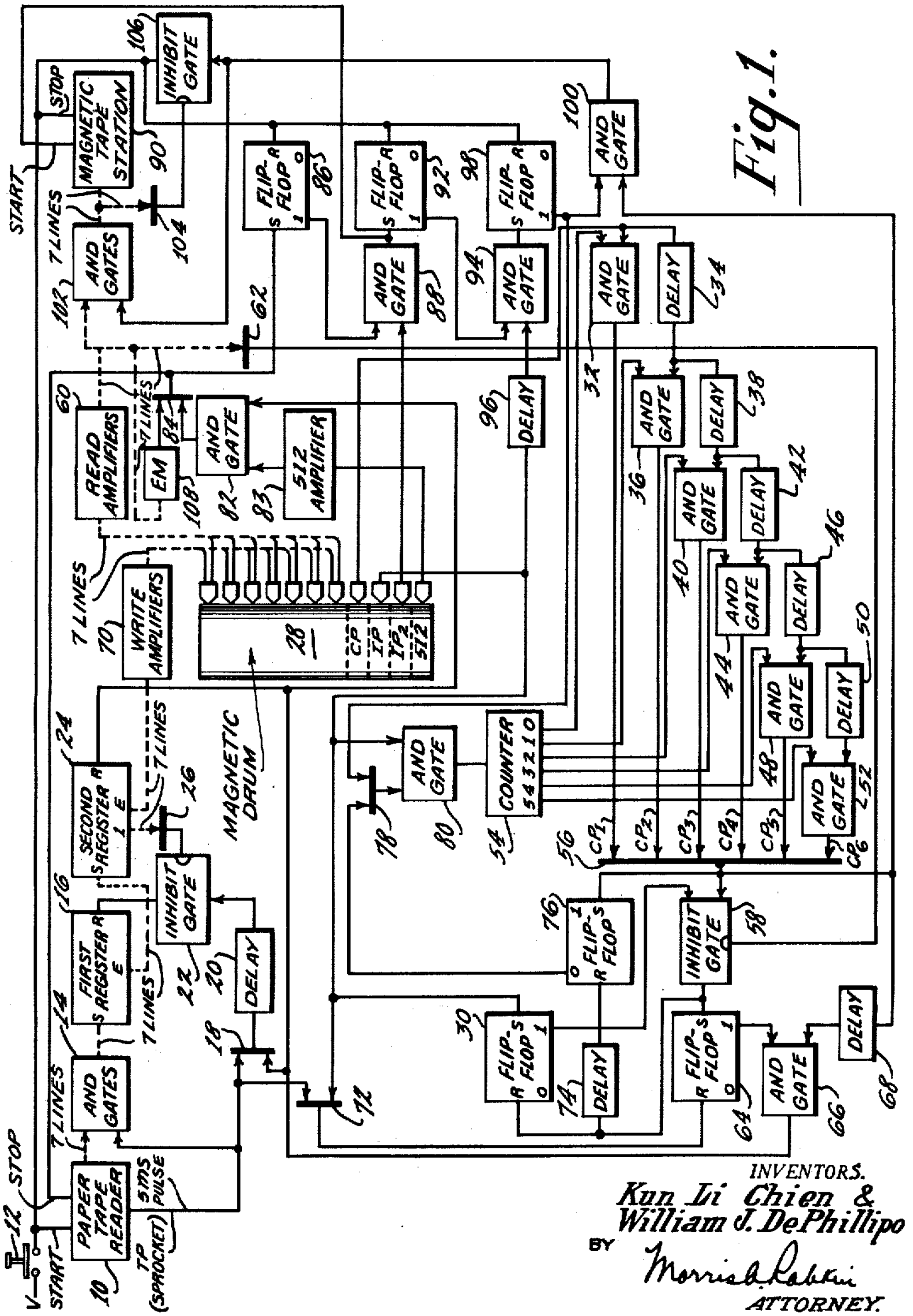

This invention relates to a system for translating information between media which operate at different speeds.

Arrangements for translating information from one form of storage to another form of storage are known. For example, one such arrangement is described in the copending sole application of coinventor Kun Li Chien, Serial No. 511,155, filed May 26, 1955.

When data is to be translated from low speed storage to high speed storage, a simple, economical device for translating the information is desirable. For example, information may be encoded on magnetic tape in the form of magnetized spot patterns and on cards in the form of perforation patterns. Perforated records, such as perforated paper tape, are simply, economically made, and supply a permanent record at low cost, but are handled at a low speed. Magnetic tape, on the other hand, has the particular advantage that information stored on the tape may be densely packed and rapidly handled. Furthermore, magnetic tapes may be erased and used repeatedly in information sorting and collating processes. Magnetic tape is more suited for high speed operation than paper tape.

It is therefore an object of this invention to provide an improved device for translating information between media operating at different speeds, which device is characterized by simplicity and economy.

A further object of this invention is to provide an improved system for translating data from one storage medium to a relatively higher speed storage medium, said system operating more accurately than the systems of the prior art.

Another object of this invention is to provide an improved system for translating information from a paper tape to a magnetic tape more rapidly and efficiently than heretofore known.

Yet another object of this invention is to provide an improved system for translating characters of information recorded on a perforated paper tape to corresponding characters of information recorded on magnetic tape, which system is characterized by accuracy of translation, reliability of operation, and simplicity of design. A character may be defined as one of a set of elementary marks or events which may be combined to express information. For example, the letter A, expressed in binary coded form, is a character.

In accordance with one embodiment of the invention the system translates information from an input device at one speed to a higher speed output device in parallel. Bits representing characters of information are read in parallel from the input device and placed into character registers for temporary storage. The bits representing these temporarily stored characters are then transferred in parallel onto a magnetic drum having a storage capacity exceeding that of the registers. The characters are transferred, preferably, in interlaced fashion. In repeated fashion, addition characters of information are transferred through the character registers and onto the magnetic drum. When the magnetic drum has stored a predetermined number of characters, preferably to saturation of the drum (that is, all the drum can hold) or a full message, the information is transferred at the higher speed to an output device, a character at a time.

Figure 2:
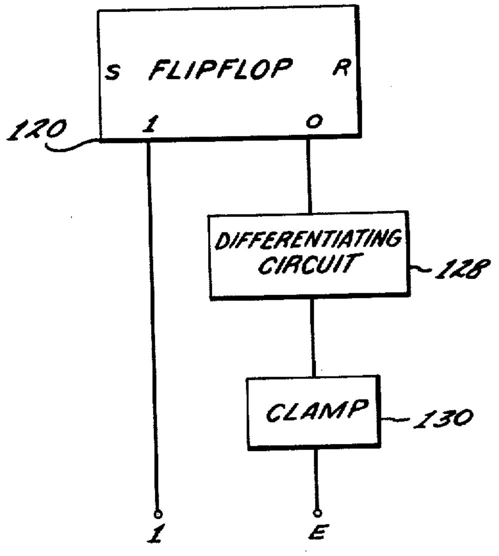

The novel features of the invention, as well as the invention itself, both as to its organization and method of operation will best be understood from the following description when read in connection with the accompanying drawings in which:

Figure 1 is a block diagram of one arrangement which may be employed in the practice of the invention, and Figure 2 is a block diagram of one stage of a register shown in Figure 1.

Referring now to Figure 1, a paper-tape reader 10 commences operation upon the impression of a suitable start signal, by means of applying a voltage through a push-button 12. The paper-tape reader 10 may have a plurality of output channels and start and stop inputs. A seven binary-digit code is assumed here for purposes of illustration. Accordingly, the paper-tape reader 10 has seven output lines in parallel. Characters encoded on paper tape are read out from the paper-tape reader 10 in parallel to a first input of "and" gates 14, each having two inputs. Synchronous with the driving mechanism of the paper-tape reader is a source of timing pulses TP of a five millisecond repetition rate. The timing pulses may be synchronous with sprocket perforations of the tape. As the paper-tape is read, timing pulses TP from the paper-tape reader 10 are directed to the second input of the "and" gates 14, appearing at the "and" gates 14 at the instants of arrival of the character information from the paper-tape reader 10. Upon the coincidence of timing pulses TP with the character pulses, the character information is transferred through the "and" gates 14 in parallel to set a first register 16. Simultaneously, the timing pulse TP is directed through an "or" gate 18, passing through a delay 20, to an input of an inhibit gate 22. At this time, assume that no information is present in a second register 24. Any information that was present in the second register 24 would cause at least one of the seven lines of the second register 24 "one" output terminals to be "high." This "high" voltage feeds through an "or" gate 26, the output of which is directed to inhibit the gate 22. In the absence of information stored in the second register 24, the gate 22 is not inhibited, and the pulse appearing at the input of the gate 22 passes through. The timing pulse, having passed through the gate 22, resets the first register 16.

Each of the registers 16 and 24, as shown in Figure 1, is so designed as to provide a read-out from that register when it is reset. Each register is capable of storing one character at a time. Specifically, due to the provision of a seven binary-digit (i.e. seven bit) code upon the tape, and hence, the seven output lines from the paper-tape reader, each character is composed of seven bits. Therefore, a register, used for storing one character, may contain seven corresponding stages, in order to accommodate information appearing at the corresponding seven input lines to the registers. Each stage of the registers 16 and 24, as shown by way of example in Figure 2 may include a flip-flop 120 having "set" and "reset" input terminals. Each flip-flop 120 has a "1" output terminal and a "0" output terminal. Each "1" output is at an enabling (high) level when its flip-flop is set and at a non-enabling (low) level when its flip-flop is reset. Each "0" output is at an opposite level to that of the "1" output. Connected to the "0" terminal, of each flip-flop 120, is a differentiating circuit 128. A clamp 130 is coupled to the output of the differentiating circuit 128. The output of the clamp 130 is connected to a terminal E. Each stage is so designed that upon setting of a flip-flop 120, a "high" level of voltage is present at the "1" terminal. Upon resetting the flip-flop, the level of voltage drops from a "high" level to a "low" level at the "1" terminal, while the voltage at the "0" terminal increases from a "low" to a "high" level. The change from "low" to "high" is differentiated, and clamped, providing a pulse output at terminal E when the flip-flop is reset. In effect, the character stored in the registers is "read out." For simplification of illustration, no "ground" or B-plus voltages are shown.

Upon resetting the first register 16, the seven-bit character stored in the first register is read out and the character pulses set the second register 24 correspondingly. The first register 16 is returned to its original state. The delay 20 is of sufficient time to permit the character to be first stored in the first register 16 prior to its transfer to the second register 24. That is, when a character is initially read, it passes through the "and" gates 14 for temporary storage in the first register 16, and subsequently passes to the second register 24 for storage.

When the second character is read, it passes through the "and" gates 14, which were opened by the timing pulse TP of the next cycle. The second character is then stored in the first register 16 and remains there temporarily due to the inhibiting of the gate 22. At this point of time there is a character recorded in the first register 16 and another character recorded in the second register 24. No characters are recorded on the main portion of a magnetic drum 28.

The drum 28 has recorded on one track an index pulse IP which is read once per revolution of the drum. At every revolution of the drum, which rotates at 6400 r.p.m., the index pulse IP is read out and set a flip-flop 30. On another channel of the drum 28 are stored 95 clock pulses, CP, at equidistant intervals. Clock pulses may be recorded in interlaced fashion, as described in a copending application entitled "Method of and System for Storing Data Magnetically," filed April 20, 1955, Serial No. 502,647, by Lowell S. Bensky et al., and assigned to the assignee of this application. The clock pulses are directed to one input of an "and" gate 32, and also to a delay 34. The output of the delay 34 is fed to one input of an "and" gate 36 and also fed into a delay 38. The output of the delay 38 is fed to an input of an "and" gate 40 and also fed to a delay 42. The output of the delay 42 is fed to an input of an "and" gate 44 and also is fed to a delay 46. The output of the delay 46 is fed an input of an "and" gate 48 and to a delay 50. The output of the delay 50 is fed to an input of an "and" gate 52. A counter 54 provides a voltage at any one of six output terminals. At the initial condition, the voltage will be present at 0-output. When the input of the counter 54 is pulsed, the counter would advance to 1. When the counter 54 is pulsed again, it would advance to 2, etc. Presently, it is assumed that the counter is set at 0. The outputs of the counter 0, 1, 2, 3, 4, and 5 are fed, respectively, to the second inputs of the "and" gates 32, 36, 40, 44, 48, and 52, each having two inputs.

Due to the coincidence of the 0-output level from the counter and the clock pulse upon the "and" gate 32, a "first" clock pulse will be initiated. This clock pulse CP–1 passes through an "or' gate 56 to one input of an inhibit gate 58. The "one" output terminal of the flip-flop 30 is connected to a second input of the inhibit gate 58. Coupled to the reading heads on the magnetic drum 28 are read amplifiers 60, the outputs of which are directed through an "or" gate 62. The output of the "or" gate 62 is directed to an inhibiting input of the gate 58. Since, at the present time, no information appears on the magnetic drum 28, no information will be read through the amplifiers 60 and the "or" gate 62 to inhibit the gate 58. Since there is no inhibiting input, and there is the presence of a signal on the other inputs of the gate 58, an output will occur from gate 58 which sets a flip-flop 64. The "one" output of the flip-flop 64 is fed to an input of an "and" gate 66.

Clock pulses appearing from the output of the "or" gate 56 are also directed through a delay 68 (having a value equal to the transient time of gate 58 and flip-flop 64), to a second input of the "and" gate 66. Upon the coincidence of the two inputs at the gate 66, an output appears resetting the second register 24. The character stored in the second register 24 is now read out, amplified by write amplifiers 70, and written on the drum 28. Character information appearing on the seven output lines of the write amplifiers 70 are recorded simultaneously on seven corresponding channels of the drum 28. The output of the "and" gate 66 also passes through the "or" gate 18, through the delay 20, and through the gate 22, to reset the first register 16, transferring the character stored in the first register 16 to the second register 24. The first character read onto the drum corresponds to the first CP location on the drum. Upon the occurrence of the next CP–1, the character stored in the second register 24 is fed out through the amplifiers 70 and stored on the drum corresponding to the next clock pulse location. Both registers 16 and 24 are now empty.

The next timing pulse TP from the paper-tape reader 10 passes through an "or" gate 72 to reset the flip-flop 64, thus closing the gate 66. Upon reading the next two characters, the registers may then be filled. When a clock pulse from the "or" gate 56 passes through the inhibit gate 58, it resets the flip flop 30. No output appears at the "one" terminal of the flip-flop 30, thus closing the inhibit gate 58. In addition, the clock pulse also passes through a delay 74 which resets a flip-flop 76. Clock pulses from the "or" gate 56 are also fed directly to set the flip-flop 76 so that the flip-flop 76, upon the occurrence of a clock pulse, is set, and then at a delay interval is reset.

Upon another revolution of the magnetic drum 28, the next index pulse sets the flip-flop 30. An output then appears upon the "one" terminal of the flip-flop 30 which opens the gate 58. As the reading heads at the magnetic drum 28 pass the first two positions for CP–1, information is read out through the read amplifiers 60 and through the "or" gate 62 to provide an inhibiting input at the gate 58, preventing information from passing through the gate 58. When the magnetic drum 28 revolves to the third position for CP–1, where no information is present on the drum, nothing will be read through the amplifiers 60 or the "or" gate 62 to provide an inhibiting input for the gate 58, thus opening the gate. Clock pulses may then pass through the gate 58, permitting the characters stored in the first and the second registers 16 and 24 to be transferred through to the magnetic drum 28.

The next two characters may then be read out from the paper-tape reader through the "and" gates 14 and stored in the registers 16 and 24. The above procedure continues until 95 clock pulse locations are filled. The ninety-fifth clock pulse resets the flip-flop 76 creating a pulse appearing at its "0" terminal. This pulse is directed to an input of an "or" gate 78, the output of which is directed to a first input of an "and" gate 80. When the next index pulse IP is read, it is fed through a second input of the "and" gate 80, setting the counter 54 to provide an output tat its "1" terminal. Thus, the gate 32 is now closed and the gate 36 is opened. In like fashion, the counter 54 may be advanced to the 2, 3, 4, and 5 positions advancing the clock pulses to CP–3, CP-5, and CP–6. Information is thus stored on the magnetic drum 28 in interlaced fashion, that is, interlaced six times.

There are ninety-five clock pulses stored on the periphery of one channel of the drum 28. By sextupling them through suitable delays 34, 38, 42, 46, and 50, using an interlacing technique, there are obtained 570 positions on the drum for receiving information (that is, six times ninety-five). In certain computer operations, however, it is desired that coded words ultilize a maximum of 512 characters. In the event that any particular word would occur that would require more than 512 characters, the word would be broken up into several sub-words, none of which contain more than 512 characters. Two meet these ends, there is provided, on the magnetic drum 28, a separate channel which stores a pulse corresponding to the 512 position on the drum. When the 512th character is read out of the second register 24 into the magnetic drum 28, the clock pulse providing the reset pulse for the second register 24 is also directed to an input of an "and" gate 82. The pulse stored in the "512" channel is read and passed through a "512" amplifier 83 to a second input of the "and" gate 82, coinciding with the pulse that is present at the first input. Upon coincidence a pulse is read out of the "and" gate 82 and through an "or" gate 84. This "stop" pulse stops the paper-tape reader 10. The pulse which stops the paper-tape reader 10 also sets a flip-flop 86.

A secondary index pulse IP–2 is located on another channel of the magnetic drum 28. During operation, the secondary index pulse IP–2 occurs before the index pulse IP by a sufficient time to start the magnetic tape to operating speed before the index pulse IP is generated. The setting of the flip-flop 86 causes an output to appear at its "1" terminal which is directed to an input of an "and" gate 88. The reading head of the IP–2 channel of the magnetic drum 28 is connected to a second input of the "and" gate 88. Upon coincidence of a high voltage from the "1" terminal of the flip-flop 86 and the secondary index pulse IP–2, an output pulse appears from the "and" gate 88 to start a magnetic tape station 90 in operation. This output pulse also sets a flip-flop 92 causing its "1" terminal to be "high," and the voltage from this "1" terminal of the flip-flop 92 opens an "and" gate 94. When the next index pulse IP is read from the drum 28, it is passed through a delay 96 to an input of the "and" gate 94, which "and" gate has been opened by the flip-flop 92, and the index pulse IP therefore passes through the "and" gate 94. The output from the "and" gate 94 sets a flip-flop 98. The "one" terminal of the flip-flop 98 is connected to a first input of an "and" gate 100. Clock pulses appearing at the output of the "or" gate 56 may then pass through a second input of the "and" gate 100, out of the "and" gate 100 and to one input of a set of seven "and" gate 102, opening the gates 102. Information on the magnetic drum 28 is read and amplified through the read amplifiers 60, the outputs of which are connected respectively to second inputs of the "and" gates 102. The "and" gates 102, having been opened by a pulse from the output of the "and" gate 100, permit information from the output of the read amplifiers 60 to pass through the "and" gates 102 and into the magnetic tape station 90, permitting the information on the drum 28 to be read out onto the magnetic tape. The "one" terminal of the flip-flop 98 is connected to a second input of the "or" gate 78. Since the flip-flop 98 is presently set, an output will appear from the "or" gate 78. The output of the "or" gate 78, as stated previously, is directed to an input of the "and" gate 80, whereby, upon the occurrence of the next index pulse IP at the second input of the "and" gate 80, the counter 54 is advanced to its next position. Successive advances of counter 54 continue until the last character.

Information read out of the magnetic drum 28 passing through the read amplifiers 60 and the "and" gates 102 also passes through an "or" gate 104, so that any information appearing on the drum 28 appears as a signal at the output of the "or" gate 104. This output is directed to control an inhibit gate 106. When the information is completely read out of the drum 28 onto the magnetic tape, no inhibiting input appears at the gate 106. Then, a clock pulse appears at the output of the gate 100 to pass through the gate 106 to stop the magnetic tape station 90 and to start the paper-tape reader 10. The ouput of the inhibit gate 106 also resets the flip-flops 86, 92 and 98.

A coded symbol EM, indicating the end of the message, appears at the end of the message. This coded signal for "end message" passes from the magnetic drum 28 through the seven read amplifiers 60, and to an EM recognition circuit 108. The EM recognition circuit 108 is a device which provides an output pulse when, and only when, the signal for an EM character symbol is present at its seven input terminals. A circuit suitable for use as such a recognition circuit is described in U.S. Patent No. 2,648,829, entitled "Code Recognition System," issued to W. R. Ayres, et al., August 11, 1953. Upon recognition of an EM character at the inputs of the EM recognition circuit 108, a voltage pulse is obtained from its output and fed to a second input of the "or" gate 84, the output of which stops the paper-tape reader 10. When information is read out of the magnetic drum 28 and transferred to the magnetic tape station 90, the characters read out are erased from the drum by suitable means (not shown).

In the system described above, the magnetic drum 28 rotates at 6400 r.p.m., or at the rate of one revolution per 9.375 milliseconds. Characters are read from the paper tape reader 10 every 5 milliseconds during operation into the first register 16. It is necessary, therefore, to have two registers to serially store the character information from the paper tape reader prior to transfer to the drum, in order for the paper tape reader to operate at full speed when recording upon the drum. In some instances, it may be desirable to utilize more than two registers in series. However, the minimum number of registers R permissible for a given speed of the drum would be the smallest integer having a value at least $$\frac{m}{n}$$

where $m$ is the time required for one revolution of the drum, and $n$ is the character reading rate of the paper tape reader.

There has been described a system where signals representing information are transferred throughout characters at a time. That is, seven-bits of information, representing one character, are transferred simultaneously, otherwise known as a transfer "in parallel." The term "parallel" is defined as pertaining to simultaneous transmission of, storage of, or logical operations on the parts of a word, character, or other subdivision of a word, using separate facilities for the various parts.

It may bed desirable to use other than a six interlace system or other than a 95 clock pulse channel on the drum. Depending upon numerous variables, including speed of drum, linearity of amplifiers, etc., other relationships may be used.

What is claimed is:

1. A system for translating characters of information from a reading means to a recording means comprising a first register adapted to be coupled to the output of said reading means, a second register coupled to receive the output of said first register, means responsive to said second register for storing characters of information from said second register, said storing means providing an electrical, information desired pulse when said storing means is adapted to receive said characters from said second register, means responsive to a said information desired pulse from said storing means for transferring selected amounts of said characters of information through said first and second register to said storing means, and means transferring information from said storing means to said recording means.

2. In a system for translating information from a reading means to a recording means, the combination comprising a first register adapted to be coupled to the output of said reading means to store in said register units of information from said reading means, a second register coupled to receive the output of said first register, circuits including a magnetic drum coupled to the output of said second register to store on said drum a plurality of units of information from said second register, and means to transfer units of information successively through said first and second registers to said magnetic drum in response to an information desired pulse from said circuits, and means for coupling the magnetic drum to the said recording means.

3. In a system for translating characters from a perforated record to magnetic tape, said magnetic tape having a recorder adapted to receive successive characters and to record said characters on said magnetic tape, the combination comprising a first register, means to transfer units of characters from said perforated record to said first register, a gating means having a first input and a priming input, said first input being coupled to receive the output of said first register, a second register coupled to receive the output of said gating means, a magnetic drum, means to individually transfer said characters in said second register to said magnetic drum, the output of said drum being adapted to be coupled to the input of said magnetic tape recorder, said priming input of said gating means being coupled to said second register whereby said characters of information are continuously available to said second register.

4. A system for transferring characters of information from a perforated record to a magnetic tape comprising a first register, means to transfer units of said characters of information from said record to said first register, said transfer means being operable at one speed, a second register, storage circuits, means to transfer said characters individually on demand from said second register to said storage circuits, a magnetic tape recorder coupled to the output of said storage circuits, said recorder being operable at a speed in excess of said one speed, and gating means coupling the output of said first register to the input of said second register and responsive to signals from said storage circuits to pass said characters from said first register to said second register.

5. A system for transferring characters of information from an input medium to a magnetic tape comprising a first register adapted to store individual characters of information, means to transfer units of said characters of information from said input medium to said first register, said transfer means being operable at a first speed, a second register, gating means coupling the output of said first register to the input of said second register and responsive to the absence of a character of information in said second register to pass said characters from said first register to said second register, storage circuits coupled to the output of said second register, means responsive to the absence of a character in said storage circuits to transfer said characters individually in interlaced sequence from said second register to said storage circuits, and means operable at a speed in excess of said first speed and adapted to transfer said information in said storage circuits to said magnetic tape.

6. A system for transferring characters of information from a paper tape to a magnetic tape comprising a first register, means to transfer units of said characters of information from said paper tape to said first register, said means operable to transfer at a first speed, a second register, storage circuits, means including a control gate responsive to the absence of a character in said storage circuits to pass units of characters from said second register to said storage circuits in interlaced fashion, a magnetic tape recorder operable at a speed higher than said first speed, said recorder being coupled to the output of said storage circuits and adapted to record characters on said magnetic tape, and gating means coupling the output of said first register to the input of said second register and responsive to the absence of a character of information in said storage circuits to pass said characters from said first register to said second register whereby characters are always available on demand to said storage circuits.

7. A system for transferring characters of information from a paper tape to a magnetic tape comprising a first register, means to transfer units of said characters of information from said paper tape to said register at a first rate of speed, a second register, storage circuits having a capacity exceeding the capacity of said registers, said storage circuits including means to read in characters of information in interlace fashion, said read-in means including means providing a read-in pulse indicating the availability of storage for characters, means including a control gate responsive to said read-in pulse and to the absence of a character in said storage circuits to pass said characters individually from said second register to said storage circuits, a magnetic tape recorder coupled to the output of said storage circuits and adapted to encode characters to said magnetic tape at a rate of speed exceeding said first rate of speed, gating means coupling the output of said first register to the input of said second register and being responsive to said read-in pulses to pass characters stored in said first register to said second register, whereby said characters ae continuously available to said storage circuits.

8. The system claimed in claim 7 wherein said gating means is alternative responsive to the absence of a character in said second register.

9. An information rate converting system for an input device and an outpuit device operating in accordance with different non-synchronous information rates, said converting system comprising a first register, a second register and a magnetic drum storage system, means for transferring characters from said input device through said first and second registers to said magnetic drum storage system, said drum storage system being adapted to provide a read-in pulse signal to indicate the availability of space for units of characters, said output device being responsive to said storage system, means responsive to said read-in pulse and to the absence of characters in said second register to pass a character from said first register to said second register, and means responsive to said pulse signal and to the absence of a character in said storage system for transferring a character from said second register to said storage system.

10. A system as claimed in claim 9 wherein said last mentioned means includes means for resetting said second register upon the transfer of each character.

11. That system as claimed in claim 10 wherein said means to transfer characters through said first and second registers includes means for resetting said first registers upon the transferring of each of said characters.

12. That system as claimed in claim 11 including means responsive to said read-in pulse and to the absence of a character in both second register and said storage system, to pass a character through said first register and said second register and to reset said first register immediately subsequent to the passage of said character to said second register.

13. A system for transferring characters of information from paper tape to magnetic tape comprising R registers in series adapted to store individual characters of information, means to transfer characters of information successively at a time interval of $n$ from said paper tape to the first of said registers, a magnetic drum adapted to rotate at a rate of one revolution per time $m$, means to transmit characters through said registers and to record the transmitted characters on said drum, and means to fransfer information on said drum to said magnetic tape, said R being an integer equal to or greater than the ratio of $m$ to $n$.

References Cited in the file of this patent

UNITED STATES PATENTS

| | | |
|---|---|---|
| 2,702,380 | Brustman | Feb. 15, 1955 |
| 2,718,356 | Burrell | Sept. 20, 1955 |
| 2,770,797 | Hamilton et al. | Nov. 13, 1956 |